(12) United States Patent
Ansell et al.

(10) Patent No.: US 11,934,531 B2
(45) Date of Patent: Mar. 19, 2024

(54) SYSTEM AND METHOD FOR AUTOMATICALLY IDENTIFYING SOFTWARE VULNERABILITIES USING NAMED ENTITY RECOGNITION

(71) Applicant: BANK OF AMERICA CORPORATION, Charlotte, NC (US)

(72) Inventors: Benjamin John Ansell, Basingstoke (GB); Yuvraj Singh, Bracknell (GB); Min Cao, Shanghai (CN); Ra Uf Ridzuan Bin Ma Arof, Bedok (SG); Hemant Meenanath Patil, Mumbai (IN); Pallavi Yerra, Hyderabad (IN); Kaushik Mitra Chowdhury, Yio Chu Kang (SG)

(73) Assignee: Bank of America Corporation, Charlotte, NC (US)

( * ) Notice: Subject to any disclaimer, the term of this patent is extended or adjusted under 35 U.S.C. 154(b) by 642 days.

(21) Appl. No.: 17/185,492

(22) Filed: Feb. 25, 2021

(65) Prior Publication Data
US 2022/0269791 A1    Aug. 25, 2022

(51) Int. Cl.
*G06F 21/57* (2013.01)
*G06F 21/51* (2013.01)
*G06N 5/04* (2023.01)
*G06N 20/00* (2019.01)
*G06V 30/416* (2022.01)

(52) U.S. Cl.
CPC ............ *G06F 21/577* (2013.01); *G06F 21/51* (2013.01); *G06N 5/04* (2013.01); *G06N 20/00* (2019.01); *G06V 30/416* (2022.01); *G06F 2221/033* (2013.01)

(58) Field of Classification Search
CPC ...................................................... G06F 21/577
See application file for complete search history.

(56) References Cited

U.S. PATENT DOCUMENTS

| 7,627,543 B2 | 12/2009 | Lock et al. |
| 7,784,099 B2 | 8/2010 | Benjamin |
| 8,191,149 B2 | 5/2012 | Yun et al. |
| 8,307,435 B1 | 11/2012 | Mann et al. |
| 8,806,619 B2 | 8/2014 | Lomont et al. |

(Continued)

*Primary Examiner* — Simon P Kanaan (57) ABSTRACT

An apparatus includes a memory and a processor. The memory stores descriptions of known vulnerabilities and information generated by a monitoring subsystem. Each description of a known vulnerability identifies software components that are associated with the known vulnerability. The monitoring subsystem monitors software programs that are installed within a computer system. The information includes descriptions of issues that are associated with the software programs. The processor generates a set of mappings, based on a comparison between the text describing the known software vulnerabilities and the text describing the issues. Each mapping associates a software program that is associated with an issue with a known software vulnerability. The processor also uses a machine learning algorithm to predict that a given software program is associated with a particular software vulnerability. In response to predicting that the given software program is associated with the particular software vulnerability, the processor generates an alert.

20 Claims, 3 Drawing Sheets

(56) References Cited

U.S. PATENT DOCUMENTS

| | | |
|---|---|---|
| 9,003,537 B2 | 4/2015 | Raz et al. |
| 9,503,470 B2 | 11/2016 | Gertner et al. |
| 9,594,912 B1 | 3/2017 | Thioux et al. |
| 9,692,789 B2 | 6/2017 | Kirti et al. |
| 9,716,721 B2 | 7/2017 | Hovor et al. |
| 9,798,884 B1 | 10/2017 | Bishop, III et al. |
| 9,825,908 B2 | 11/2017 | Anschutz |
| 9,825,976 B1 | 11/2017 | Gomez et al. |
| 9,853,997 B2 | 12/2017 | Canzanese, Jr. et al. |
| 9,888,024 B2 | 2/2018 | Roundy et al. |
| 9,996,694 B2 | 6/2018 | Sethumadhavan et al. |
| 10,063,654 B2 | 8/2018 | Kirti et al. |
| 10,114,954 B1 | 10/2018 | Bellis et al. |
| 10,140,453 B1 | 11/2018 | Fridakis |
| 10,142,353 B2 | 11/2018 | Yadav et al. |
| 10,185,832 B2 | 1/2019 | Cam |
| 10,387,655 B2 | 8/2019 | Copty et al. |
| 10,397,246 B2 | 8/2019 | Raff et al. |
| 10,445,502 B1 | 10/2019 | Desphande et al. |
| 10,469,514 B2 | 11/2019 | Wang et al. |
| 10,496,469 B2 | 12/2019 | Fox |
| 10,534,918 B1 | 1/2020 | Davidi et al. |
| 10,536,478 B2 | 1/2020 | Kirti et al. |
| 10,558,809 B1 | 2/2020 | Joyce et al. |
| 10,878,106 B2 | 12/2020 | Davidi et al. |
| 2005/0229250 A1 | 10/2005 | Ring et al. |
| 2013/0239219 A1 | 9/2013 | Siman |
| 2014/0164297 A1* | 6/2014 | Deolalikar ............. G06N 20/00 706/12 |
| 2015/0363294 A1 | 12/2015 | Carback, III et al. |
| 2016/0065594 A1 | 3/2016 | Srivastava et al. |
| 2017/0214708 A1 | 7/2017 | Gukal et al. |
| 2018/0114171 A1* | 4/2018 | Shady ............. G06Q 10/06375 |
| 2019/0058736 A1 | 2/2019 | Stupak et al. |
| 2019/0068627 A1 | 2/2019 | Thampy |
| 2019/0147167 A1 | 5/2019 | Kim et al. |
| 2020/0005785 A1 | 1/2020 | Mang et al. |
| 2020/0382961 A1 | 12/2020 | Shattil et al. |
| 2023/0012722 A1* | 1/2023 | Del Rosario ......... G06F 21/577 |
| 2023/0336340 A1* | 10/2023 | Polleri ................ G06F 18/213 |

\* cited by examiner

SYSTEM AND METHOD FOR AUTOMATICALLY IDENTIFYING SOFTWARE VULNERABILITIES USING NAMED ENTITY RECOGNITION

TECHNICAL FIELD

The present disclosure relates generally to network security, and more particularly, to a system and method for automatically identifying software vulnerabilities using named entity recognition.

BACKGROUND

Computer systems are increasingly susceptible to cyber-attacks. Through such attacks, individuals may take advantage of software vulnerabilities to gain access to a susceptible system in order to steal, alter, or destroy a target within the system.

SUMMARY

This disclosure contemplates a security tool that is designed to operate within an organization's computer system, to identify software programs installed on the computer system that may be susceptible to security breaches. To do this, the tool continuously obtains up to date information about known software vulnerabilities by monitoring both online sources where vulnerabilities may be discussed, as well as databases that store records of known vulnerabilities. The tool gathers information from these sources in approximately real time, as the information becomes available. The tool applies a machine learning algorithm to use this vulnerability information, along with information gathered about the software programs that are installed within the computer system, to predict that certain of those software programs may include vulnerabilities that may lead to security breaches in the future. By proactively identifying potential vulnerabilities before they are taken advantage of for improper purposes, certain embodiments of the tool help to protect the computer system, including any sensitive information that may be stored in the system. An embodiment of the security tool is described below.

According to one embodiment, an apparatus includes a memory and a hardware processor communicatively coupled to the memory. The memory stores descriptions of one or more known software vulnerabilities, and information generated by a monitoring subsystem. Each description of a known software vulnerability includes text and identifies one or more software components that are associated with the known vulnerability. The monitoring subsystem monitors a set of software programs that are installed within a computer system. The information generated by the monitoring subsystem includes one or more descriptions of issues. Each description of an issue includes text and is associated with at least one software program of the set of software programs. The hardware processor generates a set of mappings, based on a comparison between the text of the descriptions of the one or more known software vulnerabilities and the text of the descriptions of the one or more issues affecting the computer system. Each mapping associates a software program that is associated with an issue of the one or more issues with a known software vulnerability of the one or more known software vulnerabilities. The processor also uses a machine learning algorithm to predict, based at least on the set of mappings and information generated by the monitoring system that is associated with a given software program, that the given software program is associated with a particular software vulnerability of the one or more software vulnerabilities. The given software program is installed within the computer system. The set of mappings does not include a mapping associating the given software program with the particular software vulnerability. A probability that the given software program exhibits the particular software vulnerability is greater than a threshold. In response to predicting that the given software program is associated with the particular software vulnerability, the processor generates an alert indicating that the given software program is susceptible to security breaches through the particular software vulnerability.

Certain embodiments provide one or more technical advantages. As an example, an embodiment trains a named entity recognition (NER) algorithm to identify and classify cyber-security keywords, and then uses this algorithm to generate a set of mappings between known software vulnerabilities and issues identified within a computer system. In particular, the embodiment applies the NER algorithm to both textual descriptions of the software vulnerabilities and textual descriptions of issues, and then compares the resulting keywords and associated classifications to identify matches. As another example, an embodiment continuously monitors a set of external sources to determine if and when any of the sources publish information about newly identified software vulnerabilities. The embodiment then gathers this information and uses it to generate textual descriptions of the newly identified software vulnerabilities. As a further example, an embodiment uses a machine learning algorithm to predict that a given software program may be susceptible to a particular software vulnerability, alerts a system administrator to this potential vulnerability, and prevents the software program from executing until the system administrator is able to investigate the potential vulnerability. This helps to protect the computer system in which the software program is involved from security threats associated with the potential vulnerability, while providing the system administrator with time to perform any remediation tasks. The system described in the present disclosure may particularly be integrated into a practical application of a security tool for use by an organization that operates a large number of software programs and/or stores sensitive information within its computer systems, to proactively identify potential software vulnerabilities before such vulnerabilities can be taken advantage of.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1A:
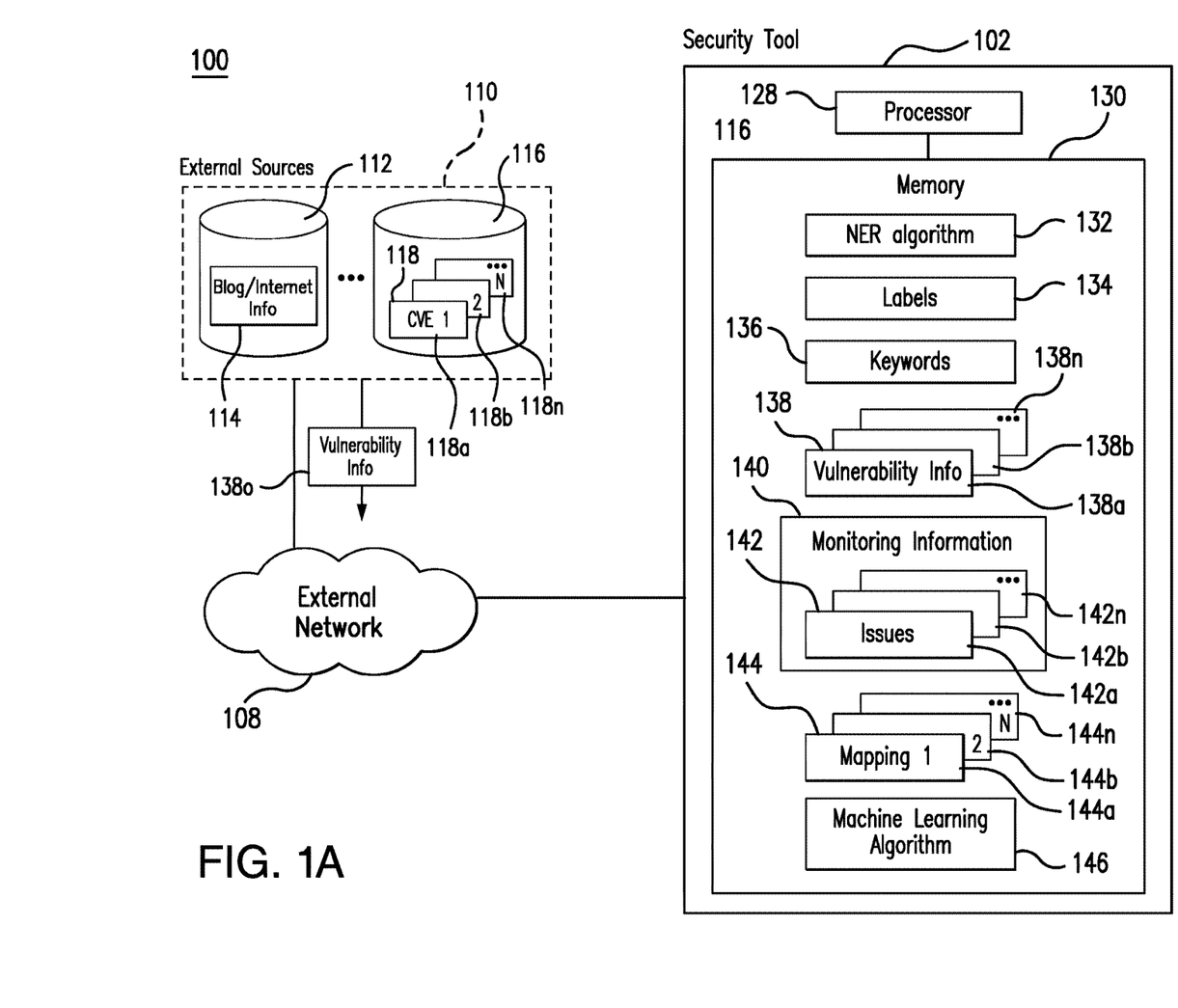
FIGS. 1A and 1B illustrate an example security system.
Figure 1B:
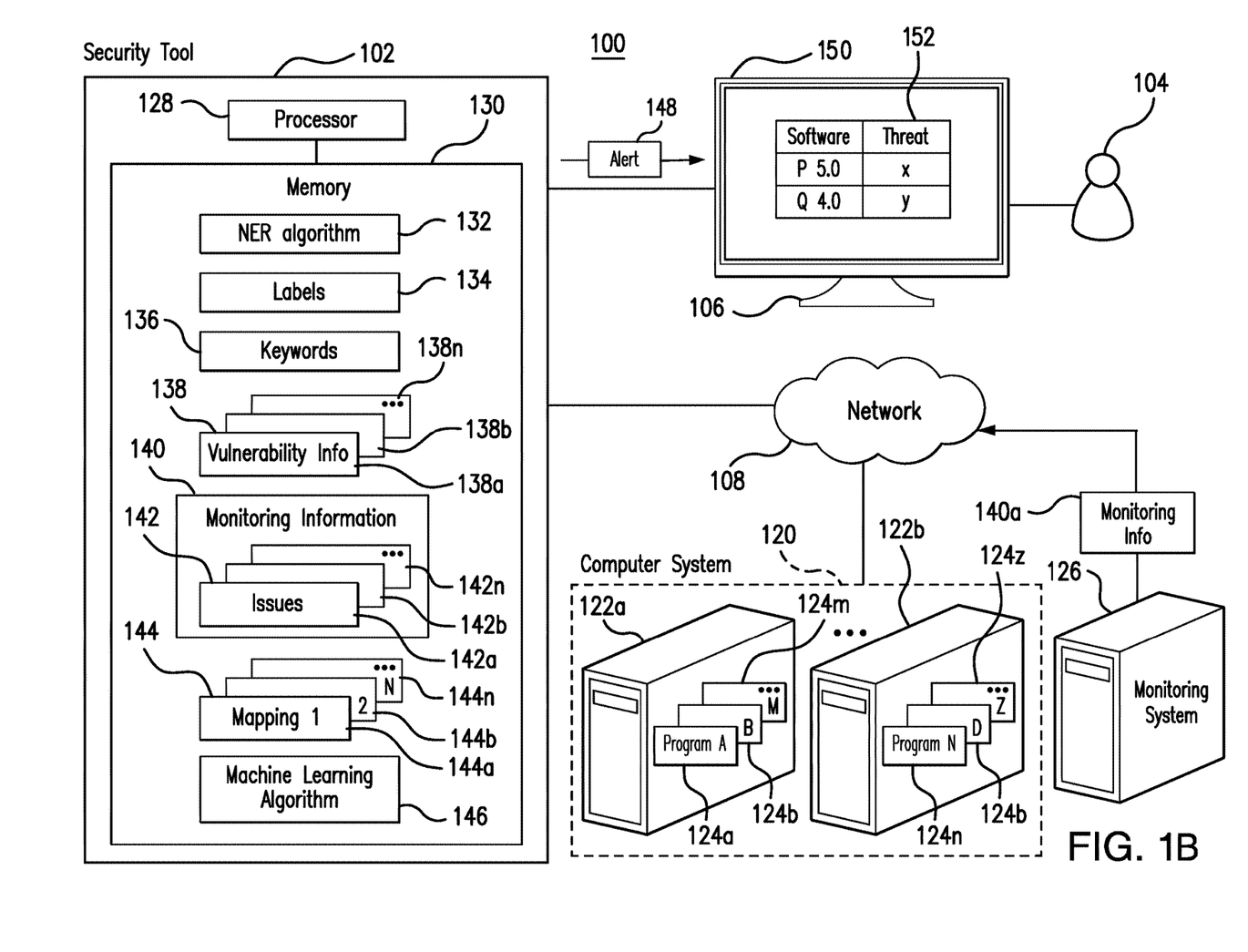
Figure 2:
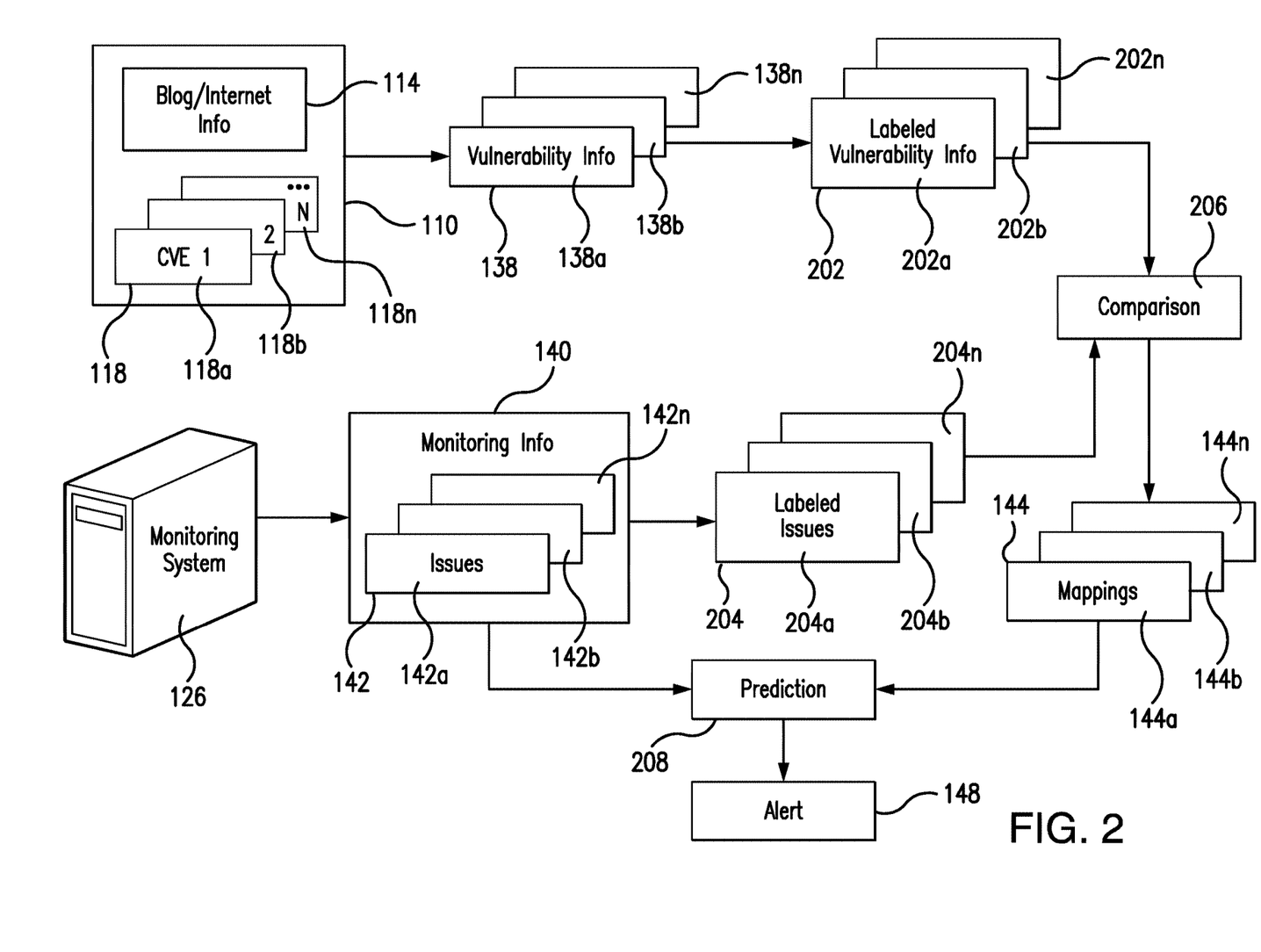
FIG. 2 illustrates an example operation of the security tool of the system of FIGS. 1A and 1B, to automatically identify software programs installed within the system that may be susceptible to security breaches through the particular software vulnerability.

Embodiments of the present disclosure and its advantages may be understood by referring to FIGS. 1A, 1B, and 2 of the drawings, like numerals being used for like and corresponding parts of the various drawings.

I. System Overview

FIGS. 1A and 1B illustrate an example security system 100 that includes security tool 102, user(s) 104, device(s) 106, network 108, external sources 110, internal computer system 120, and monitoring system 126. Generally, security tool 102 (1) receives information about known software vulnerabilities 138 from external sources 110; (2) receives information 140, from monitoring system 126, about the software programs 124a through 124z that are installed within computer system 120, including any identified issues 142 related to these programs; (3) generates mappings 144 between the software programs 124a through 124z that are associated with the identified issues 142 and the known vulnerabilities 138, by processing the text describing the issues and the text describing the known vulnerabilities using a named entity recognition algorithm 132; (4) uses these mappings 144 to predict that certain software programs include/are susceptible to one or more vulnerabilities; and (5) generates alerts 148, notifying users 104 of these potential vulnerabilities. Details of the manner by which security tool 102 performs these tasks are presented below, and in the discussion of FIG. 2.

Devices 106 are used by users 104 located on network 108 to communicate with security tool 102, external sources 110, computer system 120, and/or monitoring subsystem 126. As an example, in certain embodiments, user 104 may use device 106 to receive alerts 148, notifying user 104 of potential software vulnerabilities that may affect one or more software programs 124a through 124z that are installed in computer system 120, and/or that may be installed in computer system 120 in the future. Device 106 may receive alerts 148 in any suitable manner. For example, in certain embodiments, device 106 may receive an alert 148 as an email, an SMS, or in any other suitable manner. In some embodiments, and as illustrated in FIG. 1B, device 106 includes security tool 102 and display 150 (e.g., processor 128 and memory 130 of security tool 102 corresponds to a processor and memory 130 of device 106, which are configured to display information generated by security tool 102 on display 150). In certain embodiments, device 106 is separate from security tool 102 and receives information generated by security tool 102 over network 108.

In some embodiments, and as illustrated in FIG. 1B, device 106 is configured to receive alerts 148 and display information about the alerts to user 104 through a dashboard 152 displayed on display 150 of device 106. Dashboard 152 may provide an identification of a specific software program in a first region 154a of the dashboard, along with an associated vulnerability, predicted by security tool 102 as likely affecting that software program, in a second region 154b of the dashboard. For example, as illustrated in FIG. 1B, dashboard 152 may present to user 104 an indication that version 5.0 of software program P may include a vulnerability that exposes it to threat x, and that version 4.0 of software program Q may include a vulnerability that exposes it to threat y. User 104 may use the information displayed on dashboard 152 for any suitable purposes. For example, user 104 may use the information to make changes/updates to computer system 120 to improve the security of the system.

Devices 106 include any appropriate device for communicating with components of system 100 over network 108. For example, devices 106 may be a telephone, a mobile phone, a computer, a laptop, a wireless or cellular telephone, a tablet, a server, and IoT device, and/or an automated assistant, among others. In some embodiments, security tool 102 is a component of device 106. This disclosure contemplates devices 106 being any appropriate device for sending and receiving communications over network 108. Device 106 may also include a user interface, such as a display 150, a microphone, keypad, or other appropriate terminal equipment usable by user 104. In some embodiments, an application executed by a processor of device 106 may perform the functions described herein.

Network 108 facilitates communication between and amongst the various components of system 100. This disclosure contemplates network 108 being any suitable network operable to facilitate communication between such components. In certain embodiments, network 108 may include both an external network, as illustrated in FIG. 1A, and an internal network, as illustrated in FIG. 1B. For example, security tool 102 may be configured to communicate with external sources 110 over external network 108, and to communicate with computer system 120, monitoring system 126, and/or device 106 over internal network 108. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

External sources 110 include any sources, external to computer system 120, that may store information about known software vulnerabilities. This information may include a description of the vulnerability, an identification of software components that are known to include the vulnerability and/or be susceptible to security breaches associated with the vulnerability, an identification number assigned to the vulnerability, a description of the manner(s) in which the vulnerability may be taken advantage of, and/or any other suitable information. External sources 110 may include any number of storage locations (illustrated in FIG. 1A as first storage location 112, and second storage location 116), capable of storing information about known software vulnerabilities. External sources 110 may store vulnerability information in structured and/or unstructured form. As an example, first storage location 112 may correspond to an unstructured storage location that may store unstructured information 114 about known software vulnerabilities that is hosted online, including, for example, as a blog, a discussion forum, and/or a social media site. For example, unstructured information 114 may correspond to a conversation between individuals on a message board, discussing different manners by which a given software vulnerability could be taken advantage of. As another example, second storage location 116 may correspond to a structured storage location (e.g., a structured database), that stores information about known vulnerabilities. For example, second storage location 116 may store common vulnerabilities and exposures (CVE) data and/or may correspond to a national vulnerability database (NVD) that stores records 118a through 118n, with each record assigned to a specific known vulnerability.

Internal computer system 120 includes any number of computational components 122a/b, on which one or more software programs 124a through 124z are installed. For example, computational components 122a/b may include data servers, application servers, web servers, and/or any other suitable computational components capable of executing software. Software programs 124a through 124z include any type of software program, designed for any type of purpose. Software programs 124a through 124z may include publicly available software programs, proprietary software programs, open source software programs, programs designed by employees of the organization that owns computers system 120, and/or any other type of software programs. Software programs 124a through 124z may be written in any suitable programming language. For example, one or more of software programs 124a through 124z may be written in C++, C#, Java, Python, JavaScript, R, PHP, Scala, Rust, and/or any other suitable programming language. One or more of software programs 124a through 124z may share software components with one another and/or implement software components from publicly available software libraries, and/or proprietary software libraries. Software programs 124a through 124z may include different versions of the same program, and/or different programs that are used for the same purpose. For example, software programs 124a through 124z may include multiple versions of a first type of text editor, and multiple versions of a second type of text editor.

Monitoring system 126 is any component/collection of components within system 100 that is designed to monitor programs 124a through 124z running on computer system 120 and/or components 122a/b of computer system 120, identify issues 142 affecting one or more of programs 124a through 124z, and/or generate any other relevant information associated with programs 124a through 124z. Monitoring system 126 may correspond to a computational component on which monitoring software is installed, that is separate from computational components 124a/b of computer system 122 (as illustrated in FIG. 1B), and/or monitoring system 126 may correspond to monitoring software that is installed on one or more of computational components 124a/b. In certain embodiments, monitoring system 126 may correspond to monitoring software that is installed in memory 130 of security tool 102 and that is executed by processor 128. Monitoring system 126 generates information 140 about the software programs 124a through 124z that are installed and running on computer system 120, and transmits this information to security tool 102. Monitoring system 126 may be configured to send security tool 102 new information 140a in any suitable manner. As an example, in certain embodiments, monitoring system 126 may be configured to send security tool 102 new information 140a in response to a request for such information from security tool 102. As another example, in certain embodiments, monitoring system 126 may be configured to send security tool 102 new information 140a at regular time intervals. As a further example, in certain embodiments, monitoring system 126 is configured to send security tool 102 new information 140a when such information becomes available. In this manner, security tool 102 may receive information from monitoring system 126 in approximately real time, as such information is generated by monitoring system 126. Details of the types of information 140a that may be generated by monitoring system 126 are presented below, in the discussion of memory 130.

As seen in FIGS. 1A and 1B, security tool 102 includes a processor 128 and a memory 130. This disclosure contemplates processor 128 and memory 130 being configured to perform any of the functions of security tool 102 described herein. Generally, security tool 102 (1) gathers information about known software vulnerabilities 138 from external sources 110; (2) receives information 140, from monitoring system 126, about the software programs 124a through 124z that are installed within computer system 120, including any identified issues 142 related to these programs; (3) generates mappings 144 between the software programs 124a through 124z that are associated with the identified issues 142 and the known vulnerabilities 138, by processing the text describing the issues and the text describing the known vulnerabilities using a named entity recognition algorithm 132; (4) applies machine learning algorithm 146 to these mappings 144, to predict that certain software programs include/are susceptible to one or more vulnerabilities; and (5) generates alerts 148, notifying users 104 of these potential vulnerabilities. In certain embodiments, security tool 102 also trains NER algorithm 132 and/or machine learning algorithm 146. In some embodiments, security tool 102 is configured to suspend/stop a program 124 from executing within computer system 120, in response to determining that the program likely includes a software vulnerability.

Processor 128 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 130 and controls the operation of security tool 102. Processor 128 may be 8-bit, 16-bit, 32-bit, 64-bit or of any other suitable architecture. Processor 128 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 128 may include other hardware and software that operates to control and process information. Processor 128 executes software stored on memory to perform any of the functions described herein. Processor 128 controls the operation and administration of security tool 102 by processing information received from device(s) 106, external sources 110, internal computer system 120, monitoring subsystem 126, and/or memory 130. Processor 128 may be a programmable logic device, a microcontroller, a microprocessor, any suitable processing device, or any suitable combination of the preceding. Processor 128 is not limited to a single processing device and may encompass multiple processing devices.

Memory 130 may store, either permanently or temporarily, data, operational software, or other information for processor 128. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 128 to perform one or more of the functions described herein.

In certain embodiments, memory 130 may also store: (1) named entity recognition (NER) algorithm 132; (2) labels 134 for use by NER 132; (3) sets of keywords 136 that are associated with each of labels 134; (4) information about known vulnerabilities 138; (5) information 140 about the software programs 124*a* through 124*z* that are installed on computer system 120, including any identified issues 142; (6) mappings 144 between the software programs 124*a* through 124*z* that exhibit the identified issues 142 and known vulnerabilities 138; and (7) a machine learning algorithm 146.

NER algorithm 132 is an algorithm that has been trained to process text in order to (1) identify keywords 136 relevant to cybersecurity issues within the text, and (2) categorize each identified keyword using an associated label 134. As an example, a label 134 may be "software," and keywords 136 associated with this label may include the names of various software programs and/or components. As another example, a label 134 may be "event," and keywords 136 associated with this label may include phases such as "allows Local File Inclusion," "runs arbitrary code," "enforces permissions," "remote code execution," "improperly accesses objects in memory," and/or any other suitable word or phrase that is associated with the occurrence of an event. As another example, a label 134 may be "vulnerability," and keywords 136 associated with this label may include CVE identification numbers, phrases such as "information disclosure vulnerability," "memory corruption vulnerability," and/or any other suitable words or phrases that may identify a type of vulnerability. As a further example, a label 134 may be "person," and keywords 136 associated with this label may include "hacker," "locally authenticated attacker," and/or any other suitable words/phrases that may correspond to a person who may be able to take advantage of a software vulnerability for improper purposes.

NER algorithm 132 is an algorithm that has been trained not only to identify and label known keywords 136, but also to (1) recognize new keywords that belong to one or more of the categories of information to which labels 134 are assigned, and (2) label each of these new keywords with the associated label 134. As an example, NER algorithm 132 may have been trained using vulnerability keywords 136 that included phrases such as "information disclosure vulnerability," "memory corruption vulnerability," and CVE ID numbers, such as "CVE-2019-11397," but not the phrase "elevation of privilege vulnerability," or CVE ID numbers from vulnerabilities discovered in 2020. However, based on its training, NER algorithm 132 may be configured to determine that there is a high probability that the phrase "elevation of privilege vulnerability" corresponds to a software vulnerability. Accordingly, NER algorithm 132 may label this phrase with the "vulnerability" label 134. Similarly, NER algorithm 132 may be configured to determine that there is a high probability that any alphanumeric sequence that begins with "CVE" corresponds to a software vulnerability and, accordingly, a sequence such as "CVE-2020-1003" with the "vulnerability" label 134.

NER algorithm 132 is any suitable named entity recognition machine learning algorithm that can be trained to identify keywords within text and to label these identified keywords with labels 134. For example, in certain embodiments, NER algorithm 132 is an existing NER algorithm that has been pretrained to identify cybersecurity keywords within text and to label each identified keyword with an associated label 134. In some embodiments, security tool 102 is configured to train NER algorithm 132 to identify and label cybersecurity-related keywords using a set of known keywords 136, each of which has previously been assigned to a given label 134. Security tool 102 may be configured to train NER algorithm 132 in any suitable manner. For example, security tool 102 may initially train NER algorithm 132 using information from public dictionaries and known cybersecurity keywords that have been categorized according to a set of chosen labels 134. Security tool 102 may then apply the initially trained NER algorithm 132 to textual descriptions of known vulnerabilities 138. A system administrator or other user 104 may then review the results of NER algorithm 132 and annotate these results to indicate any keywords (and corresponding labels) that were missed by NER algorithm 132, and/or improperly labelled by NER algorithm 132. These annotated results may then be fed back into NER algorithm 132 to further train the algorithm. This training may be a continuous process in which user 104 periodically and/or occasionally reviews the results of NER algorithm 132 and feeds any corrections/updates back to the algorithm for retraining. In certain embodiments, retraining NER algorithm 132 may involve adding one or more additional labels to the set of labels 134, and training the algorithm to identify and classify keywords according to these new labels.

Information about known vulnerabilities 138 includes any information that identifies and/or describes software vulnerabilities that have previously been identified in any software, including, but not limited to, any of software programs 124*a* through 124*z*, any of the software libraries used by software programs 124*a* through 124*z*, and/or any software programs/components installed on computer systems other than computer system 120. In certain embodiments, information about known vulnerabilities 138 includes publicly available information. In certain embodiments, information about known vulnerabilities 138 includes information gathered by security tool 102 from external sources 110. For example, the information may include information 114 gathered from blogs, message boards, social media sites, and/or other online sources describing existing software vulnerabilities and/or vulnerabilities that may appear in the future. The information may also include information gathered from entries 118*a* through 118*n* stored in a CVE database 116 and/or a database that stores NVD information. This information may assign an identification to a known vulnerability, include a description of the known vulnerability, including any software components/programs that may be associated with it.

For each known vulnerability, vulnerability information 138 includes a textual description of the vulnerability, an identification number assigned to the vulnerability, the software that the vulnerability is associated with, and/or how the vulnerability may be taken advantage of for improper purposes. For example, vulnerability information 138*a* may include a textual description of a first vulnerability, and vulnerability information 138*b* may include a textual description of a second vulnerability. Security tool 102 may obtain vulnerability information 138 in any suitable manner. For example, in certain embodiments, security tool 102 may access external sources 110 at regular or irregular intervals to obtain vulnerability information 138 from the external sources. For instance, security tool 102 may periodically access CVE database 116 and generate vulnerability information 138 from each known vulnerability entry 118 in CVE database 116 that has been created since the last time security tool 102 accessed the database. As another example, in certain embodiments, security tool 102 may be configured to monitor external sources 110 and to determine when new information about a software vulnerability has been published in a storage location 112/116. In response to determining that new information about a software vulnerability is available, software tool 102 may access the external source 110 to obtain this information and use it to generate vulnerability information 138. In this manner, security tool 102 may obtain information about newly identified software vulnerabilities in approximately real time.

Monitoring information 140a may include any suitable information related to programs 124a through 124z. For example, information 140a may include information about the programming languages that software programs 124a through 124z are written in and/or the software components (e.g., components/functions from software libraries) that any of software programs 124a through 124z implement. Monitoring information 140a may include one or more issues/findings 142 associated with software programs 124a through 124z. As example, a first issue 142a may indicate that a software program 124a includes world-writeable files. As another example, a second issue 142b may indicate that a software program 124b has experienced a buffer overflow error. Such issues 142 may point to one or more vulnerabilities 138 within the associated software program that may leave computer system 120 vulnerable to security threats. Monitoring system 126 is configured to update the monitoring information 140 stored by security tool 102 with new information 140a, when such information becomes available. New information 140a may include information about a software program of programs 124a through 124z that has been newly installed within computer system 120, a newly identified issue affecting one or more of software programs 124a through 124z, information indicating that a previously identified issue affecting one or more of software programs 124a through 124z has not yet been resolved, and/or any other suitable information.

Mappings 144 associate software programs 124a through 124z with known vulnerabilities 138, based on a comparison between the descriptions of the issue(s) 142 affecting the software programs and the descriptions of known vulnerabilities 138. For example, a first mapping 144a may indicate that a first software program 124a has a first vulnerability (described in vulnerability information 138a), based on a first issue 142a affecting the software program, which makes the software program susceptible to security breaches. In certain embodiments, the software vulnerability included in a given mapping 144a through 144n may be identified by an identification number (e.g., a CVE ID number). Security tool 102 generates mappings 144 by applying NER algorithm 132 to the textual descriptions of known vulnerabilities 138 and the textual descriptions of issues 142, and then performing a comparison of the keywords 136 and associated labels 134 identified by the NER algorithm. The manner by which security tool 102 performs these tasks is described in further detail below, in the discussion of FIG. 2.

Machine learning algorithm 148 is any algorithm that is configured to predict, based in part on the software vulnerabilities 138 that security tool 102 has identified as currently affecting certain software programs 124a through 124z, that other software programs 124a through 124z installed on the computer system (or that may be installed at some future time) may be susceptible to security breaches based on the same or similar vulnerabilities. In particular, in certain embodiments, machine learning algorithm 138 operates on mappings 144 to predict that one or more of software programs 124a through 124z may be susceptible to security breaches through one or more vulnerabilities 138. In addition to mappings 144, machine learning algorithm 148 may take, as input, any other suitable information. For instance, machine learning algorithm 148 may operate on any information gathered by security tool 102 and stored as monitoring information 140. As an example, machine learning algorithm 148 may operate on information 140 that includes an identification of the software components and/or libraries implemented by software programs 124a through 124z, the programming languages software programs 124a through 124z are written in, the functions that software programs 124a through 124z perform, and/or any other suitable information about software programs 124a through 124z. Machine learning algorithm 148 may indicate that a given software program 124a may have a given software vulnerability and/or be susceptible to security breaches through a given software vulnerability 138 in any suitable manner. For example, in certain embodiments, machine learning algorithm 148 may output a probability that a given software program 124a has a given software vulnerability 138a. In such embodiments, security tool 102 may determine that the given software program 124a has the given software vulnerability 138a if that probability is greater than a threshold. In some embodiments, machine learning algorithm 148 may predict that certain software libraries that are used by one or more of software programs 124a through 124z may be susceptible to security breaches through one or more vulnerabilities. For example, machine learning algorithm 148 may be configured to operate on vulnerability information 138 that describes observed trends in software security breaches, to predict that certain software libraries used by one or more of software programs 124a through 124z may be susceptible to future security breaches (e.g., through one or more vulnerabilities that may not yet have been identified). Machine learning algorithm 148 may be any suitable machine learning algorithm. For example, machine learning algorithm 148 may be a random forest algorithm, a logistic regression algorithm, a support vector machine algorithm, a decision tree algorithm, a neural network algorithm, any combination of the preceding, or any other suitable machine learning algorithm.

While illustrated in FIGS. 1A and 1B, for simplicity, as including a single processor 128 and a single memory 130, security tool 102 may include any number of processors 128 and memories 130. Such processors and memories may be located together, in a single physical device, or may be located in separate physical devices and connected to one another through network 108. As an example, in certain embodiments, security tool 102 includes: (1) a first device (a first subset of processor/memory resources of processor 128 and memory 130) that is configured to monitor external sources 110 and to extract information about known vulnerabilities 138 from external sources 110; (2) a second device (a second subset of processor/memory resources of processor 128 and memory 130) that is configured to train NER algorithm 132, as well as to receive information about known vulnerabilities 138 from the first device and to apply NER algorithm 132 to known vulnerabilities 138 to extract a set of keywords and associated labels for each known vulnerability 138; (3) a third device (a third subset of processor/memory resources of processor 128 and memory 130) configured to receive the keyword/label information for each known vulnerability 138 from the second device, receive monitoring information 140 from monitoring device 126, generate mappings 144, and apply machine learning algorithm 146 to identify software programs 124 that are susceptible to one or more software vulnerabilities.

Modifications, additions, or omissions may be made to the systems described herein without departing from the scope of the invention. For example, system 100 may include any number of users 104, devices 106, networks 108, external sources 110, information storage locations 114/116, internal computer systems 120, computational components/resources 122a/b, software programs 124a through 124z, monitoring subsystems/components 126, processors 128, and memories 130. The components may be integrated or separated. Moreover, the operations may be performed by more, fewer, or other components. Additionally, the operations may be performed using any suitable logic comprising software, hardware, and/or other logic.

II. Example Vulnerability Identification

FIG. 2 illustrates an example of the operation of security tool 102 (described in conjunction with elements of FIGS. 1A and 1B), to automatically predict that one or more software programs 124a through 124z, installed within computer system 120, is associated with a vulnerability that may expose the system to the threat of future security breaches. As illustrated in FIG. 2, security tool 102 (1) receives information about known vulnerabilities 138 from external sources 110, and (2) receives information about software programs 124a through 124z from monitoring subsystem 126. For each known vulnerability identified in information stored in external sources 110 (e.g., unstructured information 114 that is published online in a blog, on a message board, on social media, etc., and/or structured information 118 that is published in a vulnerability database 116), security tool 102 generates and stores a record 138a through 138n of the known vulnerability. Each such record 138a through 138n includes a textual description of the vulnerability. The information received by security tool 102 from monitoring subsystem 126 includes any issues 142 identified for the software programs 124a through 124z that are installed in computer system 120. For each identified issue, security tool 102 generates and stores a record 142a through 142n of the issue, that includes a textual description of the issue.

Security tool 102 next generates a labeled record 202a through 202n for each known vulnerability, using corresponding records 138a through 138n of the known vulnerabilities. In certain embodiments, security tool 102 generates each labeled vulnerability record 202a through 202n by applying NER algorithm 132 to the corresponding textual description of the vulnerability that is stored in vulnerability records 138a through 138n. Each labeled vulnerability record 202a through 202n includes one or more keywords that NER algorithm 132 has identified within the textual description of the vulnerability and has categorized according to the set of labels 134. As an example, consider a first vulnerability record 138a that reads, "CVE-2020-XXX: Library Function ABC is affected by buffer overflow which may result in information disclosure." Security tool 102 may generate a first labeled vulnerability record 202a from this vulnerability record 138a, that includes the keyword "CVE-2020-XXX," which NER algorithm 132 has labeled "vulnerability," "Library Function ABC," which NER algorithm 132 has labeled "software," "information disclosure," which NER algorithm 132 has labeled "vulnerability," and the keyword "buffer overflow," which NER algorithm 132 has labeled "event."

Similarly, security tool 102 generates a labeled record 204a through 204n for each identified issue 142, using corresponding records 142a through 142n of the issues identified by monitoring subsystem 126 as affecting one or more of the software programs 124a through 124z. In certain embodiments, security tool 102 generates each labeled issue record 204a through 204n by applying NER algorithm 132 to the corresponding textual description of the issue that is stored in issue records 142a through 142n. Each labeled issue record 204a through 204n includes one or more keywords that NER algorithm 132 has identified within the textual description of the issue and has categorized according to the set of labels 134. As an example, consider a first issue record 142a that reads, "Program P, experienced a buffer overflow error while Library Function ABC was executing." Security tool 102 may generate a first labeled issue record 204a from this issue record 142a that includes the keyword "Program P," which NER algorithm 132 has labeled "software," "Library Function ABC," which NER algorithm 132 has labeled "software," and "buffer overflow," which NER algorithm 132 has labeled "event."

As illustrated in FIG. 2, security tool 102 performs comparison 206 between the set of labeled vulnerability records 202 and the set of labeled issue records 204, to generate set of mappings 144 between software 124a through 124z that is installed in computer system 120 and known vulnerabilities 138. Security tool 102 may perform comparison 206 in any suitable manner. As an example, in certain embodiments, security tool 102 performs comparison 206 by comparing the keywords 136 and associated labels 134 identified in each labeled vulnerability record 202a through 202n with the keywords 136 and associated labels 134 in each labeled issue record 204a through 204n to find a match. For example, a match between a given labeled issue record 204c and a particular labeled vulnerability record 202a may occur when: (1) all of the keywords 136 and associated labels 134 identified in the given labelled issue record 204c match keywords and associated labels identified in the particular labelled vulnerability record 202a; (2) a certain threshold number of the keywords 136 and associated labels 134 identified in the given labelled issue record 204c match keywords and associated labels identified in the particular labelled vulnerability record 202a; (3) more keywords 136 and associated labels 134 identified in the given labelled issue record 204c match keywords and associated labels identified in the particular labelled vulnerability record 202a, than in any of the other labelled vulnerability records 202b through 202n; and/or (4) any other suitable condition is satisfied, which indicates and/or suggests that the issue corresponding to labeled issue record 204a may expose computer system 120 to the software vulnerability corresponding to labeled vulnerability record 202a.

As a specific example, consider the (keyword, label) pairs for a first labeled issue record 204a, a first labeled vulnerability record 202a, and a second labeled vulnerability record 202b, provided in Table 1:

TABLE 1

| Issue 204a | Vulnerability 202a |
|---|---|
| ("Program P", "software") | (CVE-2020-xXX", "vulnerability") |
| ("Library Function ABC", "software") | (Library Function ABC", "software") |
| ("buffer overflow", "event") | ("information disclosure", "vulnerability") ("buffer overflow", "event") |

Based on a comparison 206 between these (keyword, label) pairs, security tool 102 may generate mappings 144 between "Program P" and "CVE-2020-XXX," and/or "Program P" and "information disclosure," based on the fact that both sets of (keyword, label) pairs include ("Library Function ABC", "software") and ("buffer overflow", "event"). In certain embodiments, labeled issue records 204a through 204n map one-to-one with labeled vulnerability records 202a through 202n. In some embodiments, labeled issue records 204a through 204n do not map one-to-one with labeled vulnerability records 202a through 202n. For example, security tool 102 may determine that a given issue corresponding to labeled issue record 204a may expose computer system 120 to a first vulnerability corresponding to labeled vulnerability record 202a as well as a second vulnerability corresponding to labeled vulnerability record 202b. Similarly, security tool 102 may determine that a first issue corresponding to labeled issue record 204a may expose computer system 120 to a particular vulnerability corresponding to labeled vulnerability record 202b, and that a second issue corresponding to labeled issue record 204b may expose computer system 120 to that same vulnerability.

After generating mappings 144a through 144n, security tool 102 applies machine learning algorithm 146 to all or a portion of these mappings, to generate prediction 208. As an example, machine learning algorithm 146 may operate on mappings 144a through 144n to determine that version 5.0 of software program 124a is likely associated with a vulnerability described in vulnerability information 138b, given that mappings 144a through 144n indicate that all of the older versions of software program 124a were associated with the same or a similar vulnerability. As another example, machine learning algorithm 146 may determine that software program 124d is likely associated with a vulnerability described in vulnerability information 138n, given that software program 124d performs the same or similar function to one or more other software programs 124 that are associated with that vulnerability, and/or software program 124d includes one or more of the same or similar software components as one or more other software programs 124 that are associated with that vulnerability.

Machine learning algorithm 146 may operate on any input information in addition to or instead of mappings 144a through 144n. As an example, in certain embodiments, machine learning algorithm 146 also operates on vulnerability information 138 and/or monitoring information 140. For example, machine learning algorithm 146 may operate on vulnerability information 138 that includes descriptions of potential future vulnerabilities, and/or describes trends in vulnerabilities that have been associated with security breaches, to predict that certain software programs 124 may be vulnerable to security breaches at some point in the future.

After machine learning algorithm 146 has generated a prediction 208 of a software program 124a that is likely associated with a particular vulnerability described by vulnerability information 138a, security tool 102 generates an alert 148 that indicating this potential vulnerability in software program 124a. Security tool 102 then sends alert 148 to device 106 for display to user 104. For example, as described above, in the discussion of FIGS. 1A and 1B, device 106 may display the information included in alert 148 in a dashboard 152 on display 150. In some embodiments, in response to using machine learning algorithm 146 to predict that software program 124a is likely associated with the particular vulnerability described by vulnerability information 138a, security tool 102 pauses and/or stops execution of software program 124a within computer system 120. This may be desirable to protect computer system 120 from any individuals seeking to take advantage of the particular vulnerability for an improper use, while also providing time for a system administrator to address the vulnerability.

Modifications, additions, or omissions may be made to any of the steps illustrated in FIG. 2. The process depicted in FIG. 2 may include more, fewer, or other steps. For example, steps may be performed in parallel or in any suitable order. While discussed as first security tool 102 (or components thereof) performing certain steps, any suitable components of system 100, may perform one or more of the illustrated steps.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory configured to store:
descriptions of one or more known software vulnerabilities, wherein each description of a known software vulnerability comprises text and identifies one or more software components that are associated with the known vulnerability; and
information generated by a monitoring subsystem, wherein:
the monitoring subsystem is configured to monitor a set of software programs installed within a computer system; and
the information comprises one or more descriptions of issues, each description of an issue comprising text and associated with at least one software program of the set of software programs; and
a hardware processor communicatively coupled to the memory, the hardware processor configured to:
generate, based on a comparison between the text of the descriptions of the one or more known software vulnerabilities and the text of the descriptions of the one or more issues affecting the computer system, a set of mappings, each mapping associating a software program that is associated with an issue of the one or more issues with a known software vulnerability of the one or more known software vulnerabilities;
use a machine learning algorithm to predict, based at least on the set of mappings and information generated by the monitoring system that is associated with a given software program, that the given software program is associated with a particular software vulnerability of the one or more software vulnerabilities, wherein:
the given software program is installed within the computer system;
the set of mappings does not include a mapping associating the given software program with the particular software vulnerability; and
a probability that the given software program exhibits the particular software vulnerability is greater than a threshold; and
in response to predicting that the given software program is associated with the particular software vulnerability, generate an alert indicating that the given software program is susceptible to security breaches through the particular software vulnerability.

2. The apparatus of claim 1, wherein:
each description of a known vulnerability stored in the memory was generated from information about the known vulnerability that was published by an external source of a set of external sources; and the processor is further configured to:
monitor the set of external sources;
determine that a first external source of the set of external sources has published information associated with a new vulnerability;
in response to determining that the first external source has published information associated with the new vulnerability:
generate a textual description of the new vulnerability from the information published by the first external source; and
store the textual description of the new vulnerability in the memory.

3. The apparatus of claim 1, wherein:
the memory is further configured to store a set of labels, each label associated with one or more keywords of a set of keywords; and
generating the set of mappings between the one or more issues and the one or more known vulnerabilities comprises:
for each known vulnerability of the one or more known vulnerabilities:
identify one or more keywords of the set of keywords in the text of the description of the known vulnerability; and
assign the associated label of the set of labels to each keyword of the one or more keywords identified in the text of the description of the known vulnerability; and
for each issue of the one or more issues:
identify one or more keywords of the set of keywords in the text of the description of the issue;
assign the associated label of the set of labels to each keyword of the one or more keywords identified in the text of the description of the issue; and
compare the one or more keywords and associated labels identified in the text of the description of the issue with the one or more keywords and associated labels identified in the text of the description of each known vulnerability.

4. The apparatus of claim 3, wherein:
the memory is further configured to store a named entity recognition algorithm;
identifying the one or more keywords in the text of the description of the known vulnerability and assigning the associated label to each identified keyword in the text of the description of the known vulnerability comprises applying the named entity recognition algorithm to the text of the description of the known vulnerability; and
identifying the one or more keywords in the text of the description of the issue and assigning the associated label to each identified keyword in the text of the description of the issue comprises applying the named entity recognition algorithm to the text of the description of the issue.

5. The apparatus of claim 1, wherein, in response to predicting that the given software program is associated with the particular vulnerability, the processor is further configured to prevent the given software program from executing within the computer system.

6. The apparatus of claim 1, wherein the given software program predicted to be associated with the particular vulnerability comprises at least one of:
a new version of a software program, wherein a mapping of the set of mappings associates an older version of the software program with the particular vulnerability; and software that implements components of a software library, wherein a mapping of the set of mappings associates a different software program that implements the components of the software library with the particular vulnerability.

7. The apparatus of claim 1, wherein the machine learning algorithm comprises at least one of:
a random forest algorithm;
a logistic regression algorithm;
a support vector machine algorithm; and
a decision tree algorithm.

8. A method comprising:
generating descriptions of one or more known software vulnerabilities from information published by one or more external sources of a set of external sources, wherein each description of a known software vulnerability comprises text and identifies one or more software components that are associated with the known vulnerability;
receiving information generated by a monitoring subsystem, wherein:
the monitoring subsystem is configured to monitor a set of software programs installed within a computer system; and
the information comprises one or more descriptions of issues, each description of an issue comprising text and associated with at least one software program of the set of software programs;
generating, based on a comparison between the text of the descriptions of the one or more known software vulnerabilities and the text of the descriptions of the one or more issues affecting the computer system, a set of mappings, each mapping associating a software program that is associated with an issue of the one or more issues with a known software vulnerability of the one or more known software vulnerabilities;
using a machine learning algorithm to predict, based at least on the set of mappings and information generated by the monitoring system that is associated with a given software program, that the given software program is associated with a particular software vulnerability of the one or more software vulnerabilities, wherein:
the given software program is installed within the computer system;
the set of mappings does not include a mapping associating the given software program with the particular software vulnerability; and
a probability that the given software program exhibits the particular software vulnerability is greater than a threshold; and
in response to predicting that the given software program is associated with the particular software vulnerability, generating an alert indicating that the given software program is susceptible to security breaches through the particular software vulnerability.

9. The method of claim 8, further comprising:
monitoring the set of external sources;
determining that a first external source of the set of external sources has published information associated with a new vulnerability; and
in response to determining that the first external source has published information associated with the new vulnerability generating a description of the new vulnerability from the information published by the first external source.

10. The method of claim 8, wherein generating the set of mappings between the one or more issues and the one or more known vulnerabilities comprises:
for each known vulnerability of the one or more known vulnerabilities:
identifying one or more keywords of a set of keywords in the text of the description of the known vulnerability, wherein each keyword of the set of keywords is associated with a label of a set of labels; and
assigning the associated label of the set of labels to each keyword of the one or more keywords identified in the text of the description of the known vulnerability; and
for each issue of the one or more issues:
identifying one or more keywords of the set of keywords in the text of the description of the issue;
assigning the associated label of the set of labels to each keyword of the one or more keywords identified in the text of the description of the issue; and
comparing the one or more keywords and associated labels identified in the text of the description of the issue with the one or more keywords and associated labels identified in the text of the description of each known vulnerability.

11. The method of claim 10, wherein:
identifying the one or more keywords in the text of the description of the known vulnerability and assigning the associated label to each identified keyword in the text of the description of the known vulnerability comprises applying a named entity recognition algorithm to the text of the description of the known vulnerability; and
identifying the one or more keywords in the text of the description of the issue and assigning the associated label to each identified keyword in the text of the description of the issue comprises applying the named entity recognition algorithm to the text of the description of the issue.

12. The method of claim 8, further comprising, in response to predicting that the given software program is associated with the particular vulnerability, preventing the given software program from executing within the computer system.

13. The method of claim 8, wherein the given software program predicted to be associated with the particular vulnerability comprises at least one of:
a new version of a software program, wherein a mapping of the set of mappings associates an older version of the software program with the particular vulnerability; and
software that implements components of a software library, wherein a mapping of the set of mappings associates a different software program that implements the components of the software library with the particular vulnerability.

14. The method of claim 8, wherein the machine learning algorithm comprises at least one of:
a random forest algorithm;
a logistic regression algorithm;
a support vector machine algorithm; and
a decision tree algorithm.

15. A system comprising:
a monitoring subsystem configured to monitor a set of software programs installed within a computer system;
a storage element configured to store:
descriptions of one or more known software vulnerabilities, wherein each description of a known software vulnerability comprises text and identifies one or more software components that are associated with the known vulnerability; and
information generated by a monitoring subsystem, wherein the information comprises one or more descriptions of issues, each description of an issue comprising text and associated with at least one software program of the set of software programs; and
a hardware processor communicatively coupled to the storage element, the hardware processor configured to:
generate, based on a comparison between the text of the descriptions of the one or more known software vulnerabilities and the text of the descriptions of the one or more issues affecting the computer system, a set of mappings, each mapping associating a software program that is associated with an issue of the one or more issues with a known software vulnerability of the one or more known software vulnerabilities;
use a machine learning algorithm to predict, based at least on the set of mappings and information generated by the monitoring system that is associated with a given software program, that the given software program is associated with a particular software vulnerability of the one or more software vulnerabilities, wherein:
the given software program is installed within the computer system;
the set of mappings does not include a mapping associating the given software program with the particular software vulnerability; and
a probability that the given software program exhibits the particular software vulnerability is greater than a threshold; and
in response to predicting that the given software program is associated with the particular software vulnerability, generate an alert indicating that the given software program is susceptible to security breaches through the particular software vulnerability.

16. The system of claim 15, wherein:
each description of a known vulnerability stored in the storage element was generated from information about the known vulnerability that was published by an external source of a set of external sources; and
the processor is further configured to:
monitor the set of external sources;
determine that a first external source of the set of external sources has published information associated with a new vulnerability;
in response to determining that the first external source has published information associated with the new vulnerability:
generate a textual description of the new vulnerability from the information published by the first external source; and
store the textual description of the new vulnerability in the storage element.

17. The system of claim 15, wherein:
the storage element is further configured to store a set of labels, each label associated with one or more keywords of a set of keywords; and
generating the set of mappings between the one or more issues and the one or more known vulnerabilities comprises:
for each known vulnerability of the one or more known vulnerabilities:

identify one or more keywords of the set of keywords in the text of the description of the known vulnerability; and assign the associated label of the set of labels to each keyword of the one or more keywords identified in the text of the description of the known vulnerability; and for each issue of the one or more issues:

identify one or more keywords of the set of keywords in the text of the description of the issue;

assign the associated label of the set of labels to each keyword of the one or more keywords identified in the text of the description of the issue; and compare the one or more keywords and associated labels identified in the text of the description of the issue with the one or more keywords and associated labels identified in the text of the description of each known vulnerability.

18. The system of claim 17, wherein:

the storage element is further configured to store a named entity recognition algorithm;

identifying the one or more keywords in the text of the description of the known vulnerability and assigning the associated label to each identified keyword in the text of the description of the known vulnerability comprises applying the named entity recognition algorithm to the text of the description of the known vulnerability; and identifying the one or more keywords in the text of the description of the issue and assigning the associated label to each identified keyword in the text of the description of the issue comprises applying the named entity recognition algorithm to the text of the description of the issue.

19. The system of claim 15, wherein, in response to predicting that the given software program is associated with the particular vulnerability, the processor is further configured to prevent the given software program from executing within the computer system.

20. The system of claim 15, wherein the given software program predicted to be associated with the particular vulnerability comprises at least one of:

a new version of a software program, wherein a mapping of the set of mappings associates an older version of the software program with the particular vulnerability; and software that implements components of a software library, wherein a mapping of the set of mappings associates a different software program that implements the components of the software library with the particular vulnerability.

\* \* \* \* \*